Aug. 8, 1961 W. KOWALCZYK 2,995,099
ONE HAND SOLDERING IRON
Filed Nov. 7, 1957
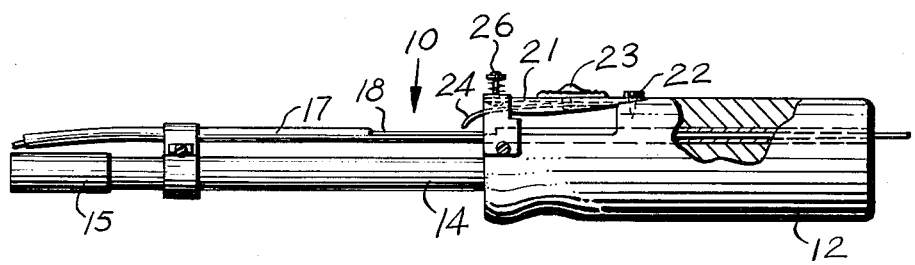
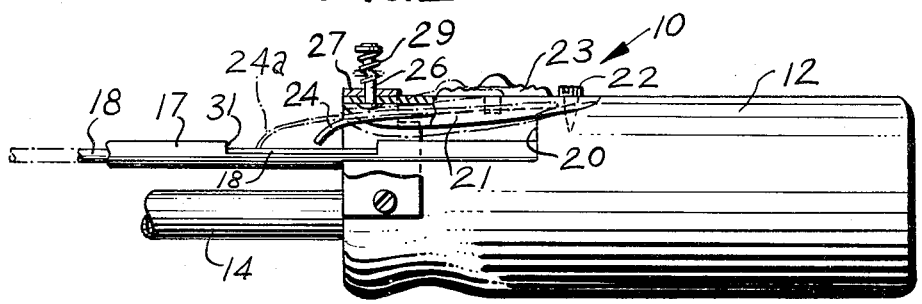
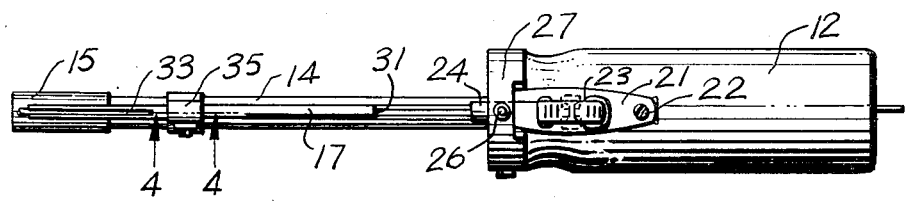
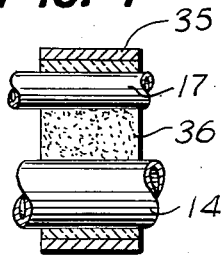
INVENTOR.
WALTER KOWALCZYK

2,995,099
ONE HAND SOLDERING IRON
Walter Kowalczyk, Wyandotte, Mich., assignor of one-tenth to Gadget-Of-The-Month Club, Inc., North Hollywood, Calif., a corporation of California
Filed Nov. 7, 1957, Ser. No. 694,952
1 Claim. (Cl. 113—109)

This invention relates to hand tools and more particularly to a hand soldering iron.

It is an object of the present invention to provide a soldering iron having self contained solder wire feed means so as to enable the soldering iron to be supplied with solder and used with one hand.

It is another object of the present invention to provide a soldering iron of the above type having self contained solder wire supply and feed elements that can be manually actuated to feed a desired quantity of solder wire to the solder tip during the use of the iron so as to prevent the waste of solder and improper application thereof to the parts being joined.

Other objects of the invention are to provide a soldering iron bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a side elevational view, with parts broken away, of a soldering iron made in accordance with the present invention;

FIGURE 2 is an enlarged fragmentary side elevational view showing the details of certain parts of the apparatus shown in FIGURE 1;

FIGURE 3 is a top plan view of the device shown in FIGURE 1; and

FIGURE 4 is an enlarged longitudinal cross sectional view taken along line 4—4 of FIGURE 3.

Referring now more in detail to the drawing, a soldering iron 10 made in accordance with the present invention is shown to include a handle 12 having a tubular casing 14 extending forwardly from the forward end of the handle 12. This casing is used to encase the electrical supply wires which are connected to the heating element within the tip 15 of the iron and to provide a rigid support for the soldering tip. Another smaller tube 17 extends through the handle 12 in spaced parallel relationship with the tubular casing 14. This smaller tube 17 slidably supports a length of solder wire 18 for longitudinal movement between the rear and forward ends thereof.

As is more clearly shown in FIGURES 2 and 3, the forward end of the handle 12 is provided with a cutout 20 over which a plate 21 is secured at its rearmost end by a screw 22. A slide button 23 is slidably supported upon this plate 21 for reciprocating longitudinal movement relative thereto. A downwardly and forwardly depending pawl 24 having a sharpened outer edge is secured to the push button 23 for reciprocating longitudinal movement therewith. A pin 26 secured to the forward end of the plate 21 extends upwardly through an arcuate band 27 secured to the forward end of the handle 12 in overlying relationship with the cutout 20. A compression spring 29 encircling the upper portion of the pin 26 acts against the uppermost portion of the pin and the top of the band 27 to urge the forward end of the plate in a direction away from the solder tube 17. However, in response to a downward and forward movement of the push button 23, the pawl 24 is adapted to frictionally engage the solder 18 that is exposed within the cutout 31 of the tube adjacent to the forward end of the handle.

Thus, in response to continued forward movement of the downwardly depressed slide button 23, the length of solder 18 is moved forwardly toward the solder tip 15. As is more clearly shown in FIGURE 3 of the drawing, the forward end of the solder tube 17 is provided with a longitudinal slot 33 which insures the free forward movement of the solder out of the forward end of the tube. A mounting band 35 having asbestos insulation 36 in engagement with the respective tubular casing 14 and solder tube 17 provides a stable support for the forward end of the solder tube so as to prevent distortion of the parts.

In actual use, a suitable wire solder is fed into the solder tube 17, after which it is only necessary to reciprocate the push button 23 downwardly and forwardly during use of the solder iron to feed the desired amount of solder to the tip. It thus becomes a simple matter to use the soldering iron with one hand while holding the work to be soldered with the other hand, thereby simplifying an otherwise difficult problem.

While various changes may be made in the detail construction, it shall be understood that such changes shall be within the spirit and scope of the present invention as defined by the appended claim.

What I claim as new and desire to protect by Letters Patent of the United States is:

A soldering iron comprising, in combination, a longitudinal handle having a forward end, a longitudinal tubular member longitudinally secured at its rear end to the forward end of said handle for enclosing electrical supply wires therewithin, a soldering tip secured to the forward end of said tubular member for connection to said wires, a solder wire feed mechanism carried by said soldering iron for supplying solder effectively transversely to said tip, said solder wire feed mechanism comprising a longitudinal tube longitudinally secured at its rear end to the forward end of said handle in spaced parallel relationship with said longitudinal tubular member and terminating in a forward dispensing tip laterally adjacent to the forward end of said soldering tip and slidably longitudinally receiving and carrying therewithin a longitudinal length of solder, a rear portion of said longitudinal tube adjacent to the front end of said handle and a contiguous forward portion of said handle defining a cut out, a cover plate movably carried by the forward portion of the handle over the part of said cut carried thereby and radially movable with respect thereto, a push button longitudinally sildably carried by said plate for forward and rearward reciprocating longitudinal movement, a pawl having a rear end connected to said push button and being positioned underneath said plate in forwardly and inwardly directed position extending through said cut out and having an engaging forward end normally positioned adjacent to and spaced from but controllably movable into frictional contact with an exposed portion of the solder within said cut out in response to forward and radially inwardly directed reciprocating movement of said pushbutton slidably carried by said plate for causing frictional engagement of said engaging end of said pawl with said exposed portion of the solder and advancing movement of said solder forwardly through the tube toward said dispensing tip thereof, and said push button being rearwardly longitudinally and radially outwardly movable for correspondingly moving said pawl back into a normal position relative to said handle with the engaging end thereof out of engagement with the exposed portion of the solder within the cut out, and a biasing spring assembly acting between said plate and said handle and urging said push button and said slidably connected pawl radially outwardly in a direction away from said cut out into normal disengaged position with respect to the exposed portion of the solder within the cut out but being controllably overridable during longitudinal and radial inward displacement of said slidably mounted push button and pawl connected thereto relative to said handle toward said dispensing tip during engagement of said engaging end of said pawl with the exposed portion of said solder and advancing movement thereof toward said dispensing tip.

References Cited in the file of this patent

UNITED STATES PATENTS

| | | |
|---|---|---|
| 1,152,043 | Orme | Aug. 31, 1915 |
| 1,309,107 | Seidel et al. | July 8, 1919 |
| 1,631,063 | Rognley | May 31, 1927 |
| 1,655,960 | Koning | Jan. 10, 1928 |
| 2,254,521 | Gardner | Sept. 2, 1941 |
| 2,466,056 | Smoke | Apr. 5, 1949 |
| 2,510,518 | Posada | June 6, 1950 |
| 2,748,245 | Pearce et al. | May 29, 1956 |

FOREIGN PATENTS

| | | |
|---|---|---|
| 976,697 | France | Nov. 1, 1950 |
| 670,973 | Great Britain | Apr. 30, 1952 |
| 1,071,681 | France | Mar. 10, 1954 |